United States Patent [19]

Ware

[11] Patent Number: 4,932,575

[45] Date of Patent: Jun. 12, 1990

[54] TRUCK-BED HOLDER

[76] Inventor: Ira J. Ware, Rte. 4, Box 143, Seminole, Okla. 74868

[21] Appl. No.: 204,107

[22] Filed: Jun. 8, 1988

Related U.S. Application Data

[63] Continuation-in-part of Ser. No. 74,497, Jul. 17, 1987, and a continuation-in-part of Ser. No. 140,815, Jan. 5, 1988.

[51] Int. Cl.⁵ .............................................. B60R 9/02
[52] U.S. Cl. ............................ 224/42.42; 224/42.24; 224/42.25
[58] Field of Search ............... 224/42.24, 42.25, 42.2, 224/42.12, 42.42, 42.45 R, 42.33, 42.38, 42.34; 248/200.1, 678; 211/23, 24; 296/37.2, 37.6; 254/102, DIG. 1, 133, 100, 101

[56] References Cited

U.S. PATENT DOCUMENTS

| | | | |
|---|---|---|---|
| 804,696 | 11/1905 | Winterhoff | 254/102 |
| 1,592,785 | 7/1926 | Soley . | |
| 2,584,015 | 1/1952 | Hawes | 254/102 |
| 2,772,826 | 12/1956 | Krengel | 224/42.24 |
| 3,204,840 | 9/1965 | Bowen | 224/42.24 |
| 3,613,972 | 10/1971 | Daughbetee | 224/42.24 |
| 3,990,618 | 11/1976 | Shattuck | 224/42.24 |
| 4,007,863 | 2/1977 | Norris | 224/42.24 |
| 4,057,182 | 11/1977 | Kolkhorst | 224/42.45 R |
| 4,308,733 | 1/1982 | Tampa | 224/42.24 |
| 4,366,923 | 1/1983 | Koch | 224/42.24 |
| 4,387,837 | 6/1983 | Carr et al. | 224/42.24 |
| 4,416,402 | 11/1983 | Matthew | 224/42.24 |
| 4,598,848 | 7/1986 | Clark | 224/42.24 |

FOREIGN PATENT DOCUMENTS

| | | | |
|---|---|---|---|
| 167805 | 8/1950 | Fed. Rep. of Germany ... | 248/200.1 |
| 1253031 | 12/1960 | France | 254/100 |

*Primary Examiner*—Linda J. Sholl
*Attorney, Agent, or Firm*—Bill D. McCarthy

[57] ABSTRACT

A truck-bed holder for fastening and securing an article in a pickup truck, the truck-bed holder comprising a length-wise adjustable post with a foot member at one end thereof and a plate at its other end, the adjustable post extendible and vertically adjustable so that the plate tightly abuts the underside of the wall flange of pickup. A fastening assembly is supported by the adjustable post and secures an article thereto.

9 Claims, 2 Drawing Sheets

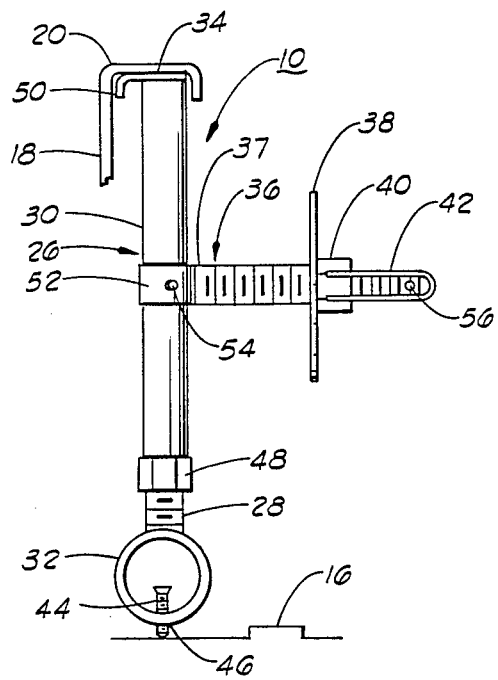
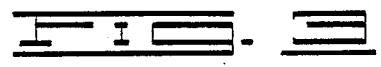
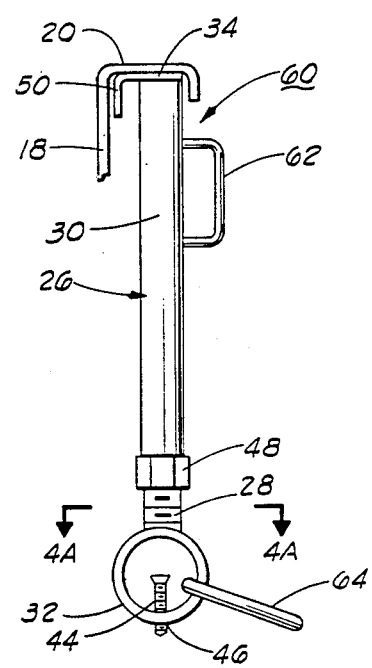
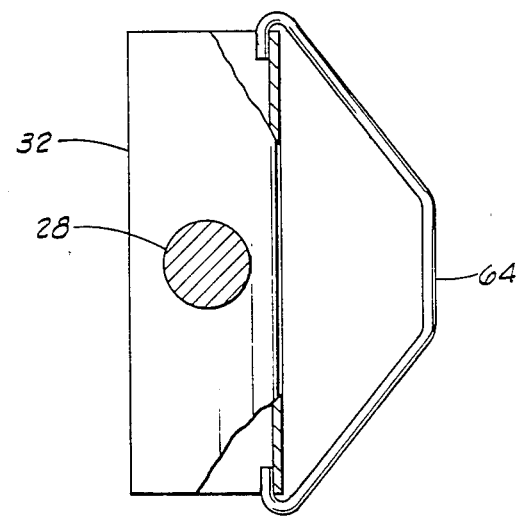

TRUCK-BED HOLDER

CROSS REFERENCE TO RELATED APPLICATION

This is a continuation-in-part of United States Design patent application entitled SPARE TIRE HOLDER, Ser. No. 74,497, filed July 17, 1987, now pending; and United States Design patent application entitled VEHICLE TIRE HOLDER, Ser. No. 140,815, filed Jan. 5, 1988, now pending.

BACKGROUND OF INVENTION

1. Field of the Invention.

The present invention relates generally to apparatus for securing articles in the bed of a pickup truck, and more particularly but not by way of limitation, to apparatus for securing a spare tire.

2. Brief Discussion of Related Art.

It appears that the related art in this field goes back to the 1920's. The development of this art is of course related to the development of cars and trucks, and most of these devices have been designed for holding spare tires.

Daughbetee, U.S. Pat. No. 3,613,972 issued Oct. 19, 1971, taught a spare tire bracket apparatus having a vertical support assembly with an anchor assembly at top and bottom, the bottom being designed for adjustable movement. A connector assembly extends horizontally from the support assembly.

Koch, U.S. Pat. No. 4,366,923 issued Jan. 4, 1983, taught a snap-in tire carrier having a substantially vertical angle brace with a planar base plate at the bottom and a spring plate and L clamp at the top. An L rod is mounted in the middle of the angle brace and extends horizontally therefrom.

Matthew, U.S. Pat. No. 4,416,402 issued Nov. 22, 1983, taught a spare tire mount having a vertical main support structure with a threaded member for adjustable vertical movement. The support structure has a plate at the bottom and a U-shaped element at the top. A tire securing device extends horizontally from the main support structure. Also, other tire mounting devices can be found in U.S. Pat. No. 4,598,848 issued to Clark; U.S. Pat. No. 4,007,863 issued to Norris; U.S. Pat. No. 4,387,837 issued to Carr et al.; and U.S. Pat. No. 3,204,840 issued to Bowen. Of interest are U.S. Pat. No. 1,592,785 issued to Soley, and U.S. Pat. No. 3,900,618 issued to Shattuck.

All of the these prior art holders are rather complex and limited in usage. The present invention presents a simpler, more universally usable holder which overcomes many of the deficiencies of the prior art.

SUMMARY OF INVENTION

The present invention provides a truck-bed holder for fastening and securing an article in the bed of a pickup truck and comprises a length-wise adjustable post with a foot member at one end and a plate member at the other end and a fastening assembly is supported by the adjustable post. When the foot is placed on the truck bed, the adjustable post is vertically extendible upwardly so that the plate tightly abuts the underside of the wall flange of the truck bed. An article can be secured to the fastening device so as to be immovable from the location of the truck-bed holder. A lock or other security device can be used to prevent the unauthorized detachment of the article from the truck-bed holder.

An object of the present invention is to provide a truck-bed holder having a minimum of parts and usable for securing articles to the bed of a pickup truck.

Another object of the present invention is to provide a truck-bed holder that can be fixed to the bed in a manner other than merely by linear compression combined with friction.

Another object of the present invention is to provide a truck-bed holder that can be used in conjunction with a lock or other security device to prevent the unauthorized removal of any articles fastened thereto.

Yet another object of the present invention is to provide a truck-bed holder that can be used to limit the range of motion of an article or to loosely fasten it to the truck bed.

Other objects, features and advantages of the present invention will be apparent from the following detailed description when read in conjunction with the drawings and appended claims.

BRIEF DESCRIPTION OF DRAWINGS

FIG. 3 is a side elevational view of the truck-bed holder of FIG. 1.

FIG. 4 is a side elevational view of another embodiment of the present invention. FIG. 4A is a view taken at 4A—4A in FIG. 4.

DESCRIPTION

Operators of pickup trucks often need storage accessories for optimum use of the bed area. These accessories should prevent theft and secure articles so that there is little or no movement within the box. The present invention provides the capability to immovably fasten a spare tire or to restrict the range of movement for an article located in the box of a pickup truck. The present invention provides a truck-bed holder which achieves these functions with simplicity of design and installation while minimizing components.

Figure 1:
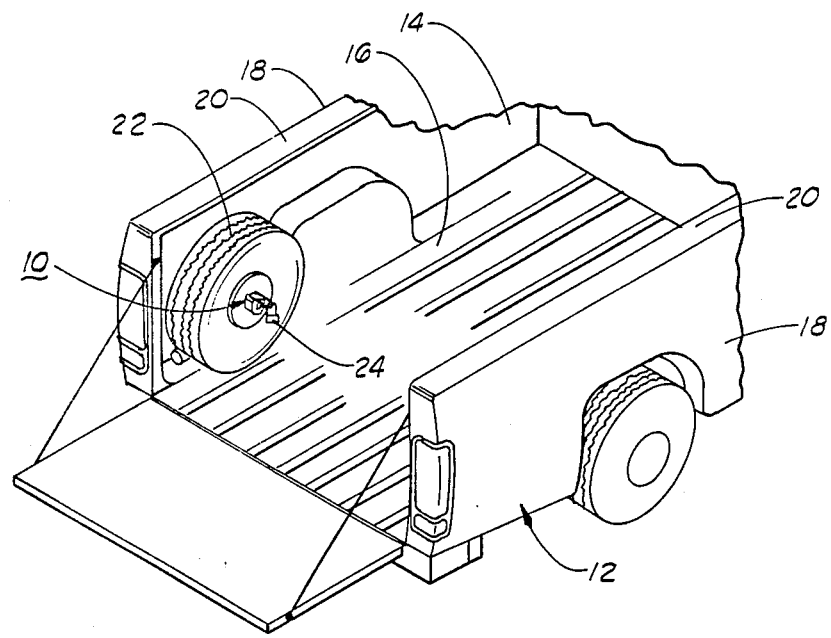
FIG. 1 is a perspective view of a portion of a pickup truck bed in which is mounted a spare tire on a truck-bed holder constructed in accordance with the present invention.

Referring to the drawings in general and FIG. 1 in particular, shown therein is a truck-bed holder 10 constructed in accordance with the present invention and depicted as it would appear when performing its function. The truck-bed holder 10 is located in a pickup truck 12 having a box 14 (i.e. the back portion of the pickup truck generally); a bed 16; a set of bed side walls 18, a wall flange 20 formed on top of each side wall 18 and which extend therefrom over the side edges of the bed 16; and a spare tire 22 which is secured by the truck-bed holder 10. The spare tire 22 partially obscures the truck-bed holder 10 in FIG. 1.

Other articles (not shown) can be secured by the truck-bed holder 10, and the different embodiment described hereinbelow may be more desired for storage depending on the shape and ease of movement of the article.

A lock 24 is used in conjunction with the truck-bed holder 10 to prevent unauthorized removal of the spare tire 22. The lock 24 is not essential for effective operation of the invention and is used at the option of the operator to achieve greater security.

Figure 2:
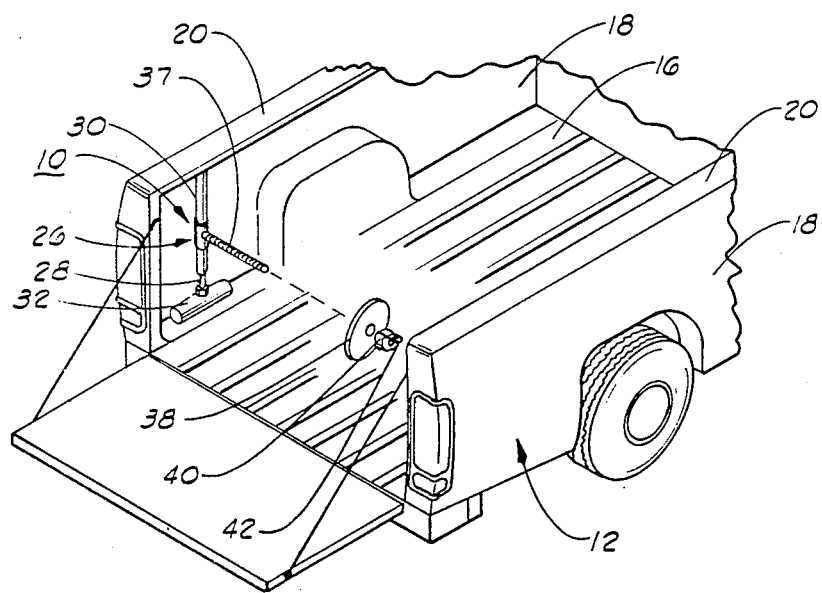
FIG. 2 is an exploded perspective view of the truck-bed holder of FIG. 1.

Referring to FIGS. 2 and 3, the truck-bed holder 10 is shown in a partially exploded view and the spare tire 22 is removed for ease of depiction. The truck-bed holder 10 comprises an adjustable post assembly 26 which is disposable to extend vertically between the bed 16 and one of the flanges 20. The adjustable post assembly 26, also sometimes referred to herein as the adjustable post, is comprised of a threaded first shaft 28 and a hollow bar 30 as shown in FIG. 2.

A foot member 32 is disposed at the bottom of the first shaft 28 and affixed thereat. The foot member 32 is pressed against the bed 16 and is made immovable with respect thereto during installation of the truck-bed holder. A plate member 34 is affixed to the top of the bar 30 and is caused to press against the underside of the selected flange 20. Because the foot member 32 and plate member 34 are caused to be immovable relative to the bed 16 and flange 20, respectively, the entire truck-bed holder 10 is horizontally immovable with respect to the bed 16 as long as vertical compression is maintained on the adjustable post 26.

An article fastening assembly 36 is provided for securing an article to the adjustable post 26, and as shown in FIG. 2, comprises a threaded second shaft 37 which is horizontally extensive and disposable along the hollow bar 30 of the adjustable post 26. The second shaft 37 serves to receive the spare tire 22 for storage. A large washer 38 with a hole in the middle is placed on the second shaft 37 after the spare tire 22 is placed thereon. The washer 38 is used in conjunction with a locking nut 40 to immovably secure the spare tire 22 to the adjustable post 26. A locking bar 42 is affixed to the locking nut 40 and is designed to receive the lock 24 as will be discussed below.

The foot member 32 is a hollow, cylindrical member having set screw members 44 extendible from threaded apertures 46 in the lower portion of the foot member 32. Two set screw members 44, also referred to herein as fixing screws, are aligned in series but only one is visible because of the angle of view. The fixing screws 44 are manually adjusted to the desired position and then hammered into the bed 16 by striking on top of the foot member 32. This feature is optional and need not be used in those instances where unneeded to retain the foot member 32 in pressing engagement with the bed 16.

As mentioned above, the adjustable post 26 is comprised of threaded first shaft 28 and hollow bar 30, and the upper end of first shaft 28 extends into the hollow bar 30 at its lower end. An adjusting nut 48 is supported on the first shaft 28. By moving the adjusting nut 48 up along the first shaft 28, the bar 30 is also moved up and the adjustable post 26 consequently becomes longer. The reverse process is used to shorten the length of the adjustable post 26. Hence the adjustable post 26 is adjustable such that the length is less than the distance between the bed 16 and the underside of the flange 20. With the foot member 32 resting on the bed 16, the adjusting nut 46 is adjusted upward until the plate member 34 abuttingly engages the underside of the flange 20 so that there is enough compression that the adjustable post 26 will not move. A plate extension 50 is provided on the plate member 34 and is designed to conform to the wall 18 for better grip.

The fastening assembly 36 also comprises a ring 52 and bar engaging screw 54 which serves to secure the second shaft 37 to the bar 30. The second shaft 37 is affixed to the ring 52. The bar engaging screw 54 is supported in a threaded ring screw hole adapted to receive same so as to cause the screw 54 to contact the bar 30 so that the ring 52 cannot move thereon. The bar engaging screw 54 can be loosened and the ring 52 and second shaft 37 adjusted vertically along the adjustable post 26 whenever desirable in order to accommodate a different sized spare tire.

A shaft hole 56 is formed in the second shaft 36 near the end distal to the adjustable post 26 and is designed to receive the lock hasp of the lock 24, the hasp also being passed through the locking bar 42 so as to prevent unauthorized removal of the spare tire 22. The adjusting nut 48 will be shielded by the spare tire 22 so that the lock 24 will have to be unlocked and removed before the adjusting nut 48 can be adjusted along its supporting first shaft 28.

Referring to FIG. 4 another embodiment of the present invention is shown, that is, a truck-bed holder 60 is shown, also with reference to the pickup truck 12 in the manner described hereinabove for the truck-bed holder 10. The truck-bed holder 60 is substantially identical in construction to the truck-bed holder 10 with the exceptions now noted, and like numerals will be used to identify the identical components thereof.

The difference is that the truck-bed holder 60 has a first connector 62 and a second connector 64. The first connector 62 is affixed to the vertical bar 30 and can be used for various purposes such as securing thereto an article, such as with binding straps (not shown), disposed in the pickup truck 12. The second connector 64, as shown in FIG. 4A, is a somewhat resilient, triangularly shaped connecting bar which is attachable to the ends of the foot member 32 as shown in FIG. 4A to provide another attaching point for the truck-bed holder 60. Either the first connector 62 or the second connector 64 can be omitted from the truck-bed holder 60 if desired.

It is clear that the present invention is well adapted to carry out the objects and attain the advantages mentioned as well as those inherent therein. While presently preferred embodiments of the invention have been described for purposes of this disclosure, numerous changes can be made which will readily suggest themselves to those skilled in the art and which ar encompassed within the spirit of the invention disclosed and as defined by the appended claims.

What is claimed is:

1. A truck-bed holder for securing an article in a bed of a pickup truck such that the article extends over a side edge portion of the bed, the bed further characterized as having a bed side wall and a wall flange extending over the side edge portion, the truck-bed holder comprising:

a post assembly positionable adjacent the bed side wall so as to extend between the wall flange and the side edge portion of the bed, the post assembly comprising:

a threaded first shaft member having a lower end and an upper end portion;

a bar member having an upper end and a hollow lower end portion, the upper end portion of the threaded first shaft member telescopically receivable in the hollow lower end portion of the bar member;

a cylindrical foot member connected to the lower end of the threaded first shaft member;

a plate member connected to the upper end of the bar member; and a threaded adjusting nut mounted on the threaded first shaft member for adjusting the telescopic extensions of the threaded first shaft member and the bar member such that when the post assembly is positioned adjacent the bed side wall, the foot member is supported on the bed and the threaded first shaft and the bar member are telescopically extended by the adjusting nut, the plate member abuts an underside portion of the flange and compression imparted on the threaded first shaft member and the bar member by the bed and wall flange prevents horizontal movement of the threaded first shaft member and the bar member;

a horizontally disposed threaded second shaft slidably supported on the bar member for supportingly engaging the article; and fastening means threadably mountable on the threaded second shaft for securing the article on the threaded second shaft and for preventing unauthorized removal of the article therefrom.

2. The truck-bed holder of claim 1 wherein the foot member is provided with at least one threaded aperture in a surface in contact with the bed and wherein the post assembly further comprises at least one fixing screw penetrating the threaded aperture and extensive therefrom to engage the bed so as to secure the foot member to the bed.

3. The truck-bed holder of claim 1 wherein the truck-bed holder further comprises:

a ring affixed at one end of the threaded second shaft, the ring coaxially mounted on the exterior of the bar member; and ring engaging means for securing the ring to the bar member.

4. The truck-bed holder of claim 3 wherein the ring has a ring hole formed on it and the ring engaging means is a ring screw which penetrates the ring hole and engages the bar so that the ring and the threaded second shaft member are secured in a vertically stable position on the bar member.

5. The truck-bed holder of claim 4 wherein at least one shaft hole, coaxial with the diameter of the threaded second shaft member, is formed in the threaded second shaft member near the end of the second threaded shaft opposite the ring.

6. The truck-bed holder of claim 5 wherein fastening means further comprises a locking nut threadably movable along the threaded second shaft member.

7. The truck-bed holder of claim 6 wherein the fastening means further comprises a locking bar affixed to the locking nut, the locking bar having an elongated slot defined therein so as to provide access to the shaft hole in the threaded second shaft.

8. The truck-bed holder of claim 7 wherein the fastening means further comprises a washer mounted on the threaded second shaft member so as to be positioned between the ring and the locking nut.

9. The truck-bed holder of claim 8 wherein the plate member has an arcuate plate extension for facile contact with the flange.

* * * * *